US00RE40636E

(19) United States
(12) Reissued Patent
Weinert et al.

(10) Patent Number: US RE40,636 E
(45) Date of Reissued Patent: Feb. 17, 2009

(54) SLIDER WINDOW ASSEMBLY

(75) Inventors: Rick M. Weinert, Novi, MI (US); Thomas M. Cleary, Belleville, MI (US); Paul J. Kolokowski, Southgate, MI (US); Michael J. Lesle, Toledo, OH (US)

(73) Assignee: Automotive Components Holdings, LLC, Dearborn, MI (US)

(21) Appl. No.: 11/805,860

(22) Filed: May 24, 2007

Related U.S. Patent Documents

Reissue of:
(64) Patent No.: 6,902,224
Issued: Jun. 7, 2005
Appl. No.: 10/678,700
Filed: Oct. 3, 2003

(51) Int. Cl.
*B60J 1/12* (2006.01)

(52) U.S. Cl. ..... 296/146.16; 296/201; 296/190.11; 49/125

(58) Field of Classification Search ..... 296/146.16, 296/201, 190.11; 49/125
See application file for complete search history.

(56) References Cited

U.S. PATENT DOCUMENTS 3,087,537 A 4/1963 Le Van
3,383,801 A 5/1968 Dallaire
4,920,698 A 5/1990 Friese et al. ..... 49/380
4,986,594 A 1/1991 Gold et al.
4,989,912 A 2/1991 Furman
5,033,246 A 7/1991 Vaughan et al.
5,228,740 A 7/1993 Saltzman
5,355,651 A 10/1994 Correia
5,449,217 A 9/1995 Takahashi
5,522,191 A 6/1996 Wenner et al. ..... 52/204.51
5,560,671 A 10/1996 Ojanen et al. ..... 296/146.14
5,799,449 A 9/1998 Lyons et al.
6,010,180 A 1/2000 Bureau et al.
6,286,891 B1 9/2001 Gage et al.

*Primary Examiner*—Dennis H Pedder
(74) *Attorney, Agent, or Firm*—MacMillan, Sobanski & Todd, LLC

(57) ABSTRACT

A slider window assembly for an automotive vehicle comprises a fixed glass panel adapted to be installed in a window frame defined by a body panel. The fixed glass panel is bonded to the window frame by an adhesive bead and defines an opening. A sliding window opens and closes the opening and includes an edge that is received in a guide rail that is adhesively bonded to the fixed glass panel. The guide rail defines a channel for the edge of the sliding window and also includes an extension that is bonded to the window frame by the adhesive bead. In this manner, the guide rail continues to support the sliding window in the event that the fixed glass panel is unable to provide the primary support function.

8 Claims, 2 Drawing Sheets

SLIDER WINDOW ASSEMBLY

Matter enclosed in heavy brackets [ ] appears in the original patent but forms no part of this reissue specification; matter printed in italics indicates the additions made by reissue.

TECHNICAL FIELD OF THE INVENTION

This invention relates to a slider window assembly of the type used in an automotive vehicle and comprising a sliding window that is supported in a guide rail and slides to open and close an opening in a fixed glass panel. More particularly, this invention relates to such slider glass window assembly wherein the guide rail is adhesively bonded to the fixed glass panel and includes an extension bonded to the window frame.

BACKGROUND OF THE INVENTION

In pickup trucks and the like, the passenger compartment may feature a rear window assembly comprising a sliding center window. One common assembly may include a sliding window that slides horizontally over an opening between separate left and right fixed panels. Alternately, the assembly may include a single fixed glass panel that encircles an opening for the sliding window. The sliding window is slidably supported by guide rails that are adhesively bonded to the fixed panel above and below the opening. There is a concern that circumstances may arise when the fixed glass panel may crack into pieces that are unable to support the guide rails with the weight of the sliding window, in which case the sliding window may fall into the passenger compartment.

Therefore, a need exists for a slider window assembly that includes a guide rail that is adhesively bonded to a fixed glass panel and is also secured to support the sliding window in the event that the fixed glass panel becomes cracked.

SUMMARY OF THE INVENTION

In accordance with this invention, a slider glass window assembly is provided for an automotive vehicle that includes a body panel that forms a window frame. The slider glass window assembly comprises a fixed glass panel that defines an opening. The border of the fixed glass panel is adhesively bonded to the window frame by a bead. A sliding window is mounted in a guide rail and movable along an axis between a closed position wherein the sliding window covers the opening and an open position wherein the sliding window is displaced relative to the opening. The guide rail is adhesively bonded to the fixed glass panel and defines a channel for slidably receiving an edge of the sliding window. In accordance with this invention, the guide rail also includes an extension that is interposed between the border of the fixed glass panel and the window frame and is bonded to the window frame also by the bead. In the event that the fixed panel cracks, the extension holds the guide rail in position to prevent the sliding window from falling.

BRIEF DESCRIPTION OF THE DRAWINGS

This invention will be further described with reference to the accompanying drawings wherein.

DETAILED DESCRIPTION OF THE INVENTION

Figure 1:
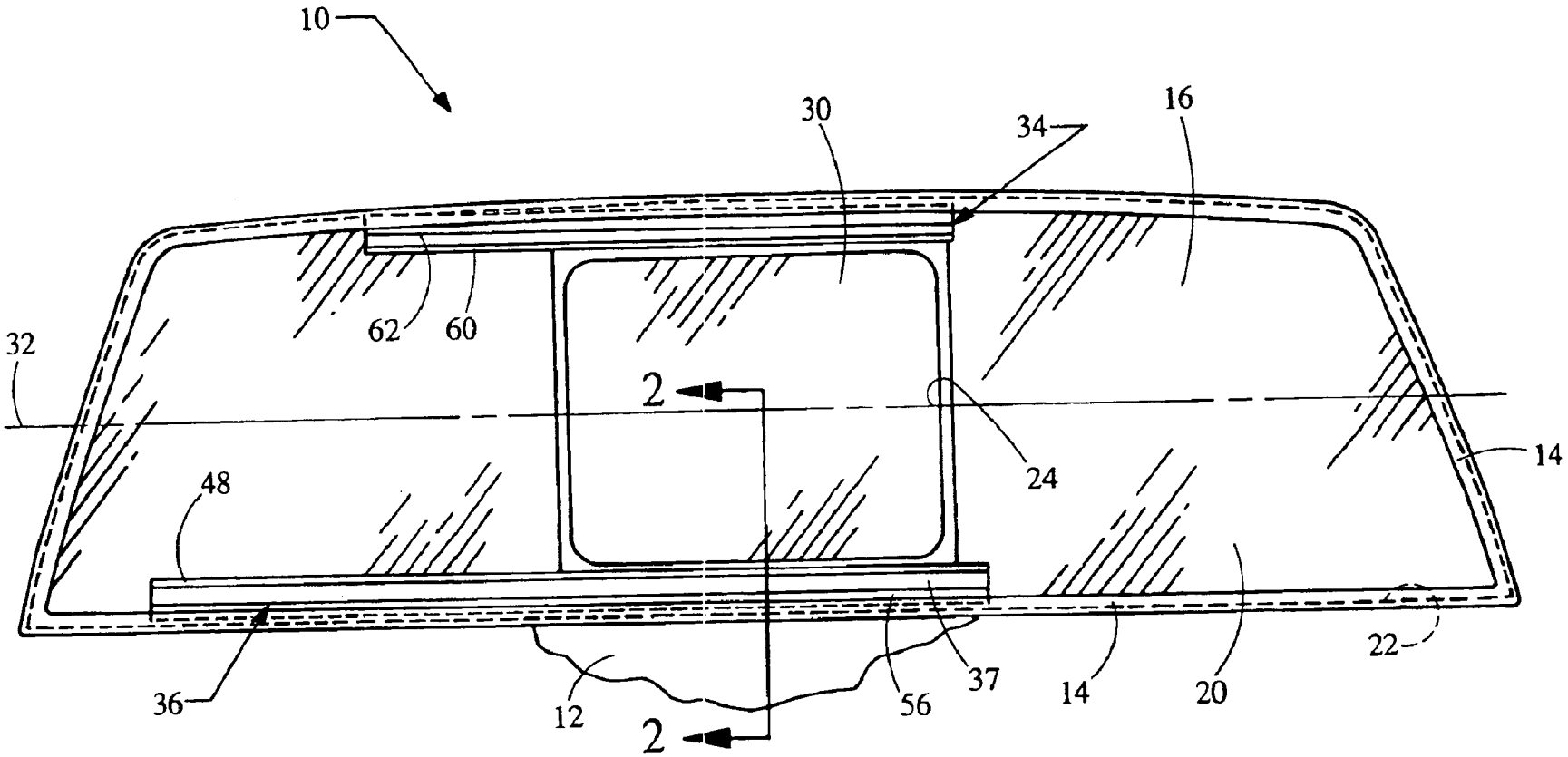
FIG. 1 is a side elevational view of a slider window assembly in accordance with a preferred embodiment of this invention.

In accordance with the preferred embodiment of this invention, referring to the Figs., a slider window assembly 10 is provided for an automotive vehicle, preferably for a rear window in a pickup truck. The vehicle includes one or more body panels 12 that define a window frame 14, as particularly shown in FIG. 2. Assembly 10 includes a fixed glass panel 16 having a border that is attached to frame 14 by a bead 18 composed of urethane adhesive material. Panel 16 includes an interior side 20 and an exterior side 22. More particularly, in the preferred embodiment, bead 18 is bonded to the interior side 20 adjacent the border of panel 16 and to a facing surface of frame 14. Bead 18 affixes panel 16 to body panel 12 and also forms a hermetic and water-tight seal for window assembly 10.

Figure 2:
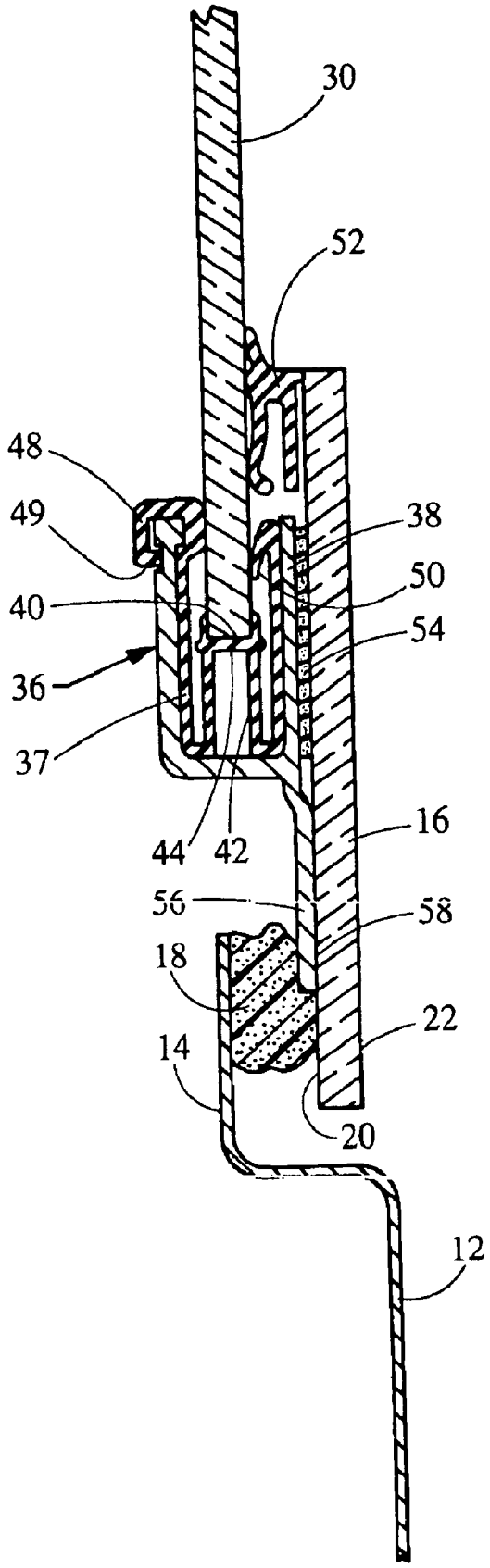
FIG. 2 is a cross-sectional view of the slider window assembly in FIG. 1, taken along lines 2—2 in the direction of the arrows.

Panel 16 is formed of a single glass pane and defines an opening 24 such that the pane entirely encircles the opening and includes strips above and below the opening. Assembly 10 also includes a sliding window 30 that slides along a horizontal axis 32 between a closed position, shown in FIG. 1, wherein window 30 covers opening 24 and an open position wherein window 30 is axially displaced relative to opening 24. Window 30 is supported by an upper guide rail 34 and a lower guide rail 36. Guide rails 34 and 36 are preferably formed of a metal extrusion, in particular an aluminum extrusion, but may be suitably formed of polymeric material. Referring to FIG. 2, guide rail 36 comprises a first arm 37 and a second arm 38 that are spaced apart to define a U-shaped channel for receiving a lower edge 40 of window 30. A guide rail insert 42 is received in the channel and includes a support 44 upon which edge 40 slidably rests. Insert 42 is formed of an extruded polymeric material and has low surface friction to facilitate sliding. Insert 42 includes a flange 48 that seals against the inner face of window 30 and wraps around the end of arm 37, with a tip 49 received in a slot in arm 37 to secure insert 42. Also, insert 42 includes a flange 50 that seals against the outer face of window 30. A seal 52 is adhesively bonded to the inner face 20 of fixed glass panel 16 and engages window 30 to provide a hermetic and water-tight seal between window 30 and panel 16.

Guide rail 36 is attached to panel 16 by double-sided adhesive tape 54. Adhesive tape 54 is affixed to arm 38 of rail 36 and to interior side 20. In accordance with this invention, rail 36 further comprises an extension 56 that extends from arm 38 juxtaposed against the interior side 20 of panel 16 and has a lower end 58 embedded in bead 18. It is pointed out that bead 18 is adhesively bonded to both glass panel 16 and extension 56, and so directly bonds rail 36 to body panel 12. In the event that fixed glass panel 16 cracks so as not to provide support through adhesive tape 54, the guide rail 36 remains supported by bead 18 to prevent sliding window 30 from falling.

Upper guide rail 34 is substantially similar to lower guide rail 36 and includes an insert 60 that is substantially similar to insert 42 except that the insert for upper guide rail 34 does not include a support 44, but rather provides clearance between about the upper edge of window 30. In accordance with this invention, rail 34 includes an extension 62 that is bonded to window frame 14 by bead 18, it being noted that the bead is continuous about the border of glass panel 16 between the frame.

When slider window assembly 10 is installed in frame 14, fixed panel 16 is bonded to and supported within the frame by bead 18. Guide rail 36 is adhesively bonded to fixed panel 16 by adhesive tape 54 to support the weight of sliding window 30. In the event that panel 16 shatters or becomes cracked in a manner that is no longer able to support the guide rail, the guide rail remains bonded to window frame 14 by bead 18. As a result, the guide rail continues to support sliding window 30 and prevents the sliding window from falling, even when glass panel 16 is unable to perform the primary support function.

In the described embodiment, the guide rail comprises arms that form a U-shaped channel to receive the edge of the sliding window, with one channel arm being directly bonded to the fixed glass panel. In an alternate embodiment, the arm adjacent the glass panel is eliminated, whereupon the arm that is spaced apart cooperates with the fixed glass panel to form a channel for receiving the edge of the sliding window. This allows the guide rail to be formed of a metal strip that is bent in a zig-zag cross-section. The extension is bonded to the fixed glass panel to attach the guide rail, and also bonded to the frame in accordance with this invention.

While this invention has been disclosed in terms of certain embodiments thereof, it is not intended to be so limited, but rather only to the extent set forth in the claims that follow.

What is claimed is:

1. A slider window assembly for an automotive vehicle that includes a body panel defining a window frame, said slider glass window assembly comprising:

a fixed glass panel having a panel border and defining an opening;

a bead directly contacting the panel border and the window frame and adhesively bonding the panel border to the window frame;

a sliding window moveable along an axis between a closed position wherein the sliding window covers the opening and an open position, said sliding window comprising an axial edge; and a guide rail adhesively bonded to the fixed glass panel and defining a channel for slideably [receiving the axial edge of] *supporting* the sliding window, said guide rail further comprising an extension interposed between the panel border and the window frame, the extension being adhesively bonded to the window frame by the bead.

2. The slider window frame of claim 1 wherein the guide rail is formed of a metal extrusion.

3. The slider window frame of claim 1 wherein the guide rail comprises a U-shaped channel having a first arm and a second arm spaced apart to receive said axial edge therebetween, and wherein the second arm is adhesively bonded to the fixed glass panel.

4. The slider window frame of claim 3 wherein the extension is juxtaposed against the fixed glass panel.

5. The slider window frame of claim 3 wherein the fixed glass panel is formed of a single glass pane encircling the opening.

6. The slider window frame of claim 3 wherein the fixed glass panel comprises an interior side, and wherein the guide rail is bonded to the interior side.

7. The slider window frame of claim 3 wherein the guide rail is a lower guide rail and defines a channel to receive a lower axial edge of the sliding window, said slider window assembly further comprising an insert received in the channel for slideably supporting the sliding window therein.

8. A slider window assembly for an automotive vehicle that includes a body panel defining a window frame, said slider glass window assembly comprising:

a fixed glass panel formed of a single [grass] *glass* pane and encircling an opening, said fixed glass panel having an interior panel side and a panel border;

an adhesive bead directly contacting said glass panel and the window frame bonding the interior panel side at the panel border to the window frame;

a sliding window moveable along a horizontal axis between a closed position wherein the sliding window covers the opening and an open position, said sliding window comprising an upper axial edge and a lower axial edge;

an upper guide rail adhesively bonded to the interior panel side above the opening and defining a channel for slideably [receiving] *supporting* the upper axial edge of the sliding window, said guide rail formed of a metal extrusion and further comprising an extension juxtaposed against the interior panel side and adhesively bonded to the window frame by the adhesive bead; and a lower guide rail adhesively bonded to the interior panel side below the opening and defining a channel for slideably [receiving] *supporting* the lower axial edge of the sliding window, said guide rail being formed of a metal extrusion and further comprising an extension juxtaposed against the interior panel side and adhesively bonded to the window frame by the adhesive bead.

* * * * *